US012722320B2

(12) United States Patent
Bailey

(10) Patent No.: US 12,722,320 B2
(45) Date of Patent: Sep. 1, 2026

(54) BEAM HOLE PUNCHER

(71) Applicant: Zachary Bailey, Spring, TX (US)

(72) Inventor: Zachary Bailey, Spring, TX (US)

( * ) Notice: Subject to any disclaimer, the term of this patent is extended or adjusted under 35 U.S.C. 154(b) by 78 days.

(21) Appl. No.: 18/965,303

(22) Filed: Dec. 2, 2024

(65) Prior Publication Data

US 2025/0178228 A1 Jun. 5, 2025

Related U.S. Application Data

(60) Provisional application No. 63/605,010, filed on Dec. 1, 2023.

(51) Int. Cl.
*B26F 1/14* (2006.01)

(52) U.S. Cl.
CPC .................................... *B26F 1/14* (2013.01)

(58) Field of Classification Search
CPC ............... B26F 1/14; B26F 1/10; B26F 1/386
See application file for complete search history.

(56) References Cited

U.S. PATENT DOCUMENTS 3,817,135 A * 6/1974 Valente ................ B21D 28/243 83/522.22
3,919,907 A * 11/1975 Kindgren ............. B21D 28/243 83/370
3,996,832 A * 12/1976 Schubert ................... B26F 1/14 83/192
4,052,880 A * 10/1977 Cullinan ................ B21D 28/28 29/896.6
4,061,064 A * 12/1977 Kindgren .............. B23B 41/003 83/560
4,160,396 A * 7/1979 Matzner ............... B26D 7/1818 83/100
RE31,042 E * 9/1982 Clark ...................... B21D 28/12 219/121.84
5,063,804 A * 11/1991 Magnuson ........... B21D 28/243 83/560
8,021,086 B2 * 9/2011 Rogers .................... B23B 39/22 33/645
10,668,640 B1 * 6/2020 Kingan ................ B21D 28/243
2012/0263815 A1 * 10/2012 Lazis ................... A21C 11/002 425/287
2021/0086389 A1 * 3/2021 Do ......................... B26D 5/086

* cited by examiner

*Primary Examiner* — Omar Flores Sanchez
(74) *Attorney, Agent, or Firm* — Accelerate IP LLC

(57) ABSTRACT

An automatic beam hole punch for punching at least one hole in a beam can include a punching motor, a punch actuated by the motor, and a movable punching clamp configured to secure the punching motor to the beam. The clamp includes a first portion, a second portion, a body, a first guide, a second guide, a travel distance sensor, and a support. The first and second portions contact the top of the beam, while the body provides a space for the top of the beam. The first guide and second guide are coupled to the first portion and contact the first face and side of the beam respectively. The travel distance sensor is coupled to either the first or second guide, and the support is coupled to the second portion.

17 Claims, 5 Drawing Sheets

BEAM HOLE PUNCHER

CROSS REFERENCE TO RELATED APPLICATIONS

This application claims benefit from U.S. Provisional Application No. 63/605,010 titled "Beam Hole Puncher" and having a filing date of Dec. 1, 2023, all of which is incorporated by reference herein.

FIELD OF THE INVENTION

The present specification relates generally to devices for hole punching device and more specifically a hole punching device that automatically measures the distance between each hole.

BACKGROUND OF THE INVENTION

In the construction and metalworking industries, the need often arises to create precise holes in structural steel beams, channels, or other load-bearing members. These holes may be necessary for various purposes, such as facilitating connections, accommodating wiring or plumbing, or allowing for the passage of other components. Traditionally, creating these holes has been a labor-intensive and time-consuming process involving drilling, plasma cutting, or oxy-fuel cutting methods. These methods, while effective, can be slow, require considerable setup time, and produce debris, noise, and fumes that necessitate safety precautions.

Furthermore, the conventional methods may not always produce perfectly round or accurately positioned holes, potentially compromising the structural integrity of the beams and necessitating additional welding or other corrective measures. In addition, the manual operation of these methods can lead to operator fatigue, inconsistency in hole quality, and increased risk of workplace injuries.

Automatic hole punching machines have been proposed to address these issues. However, these machines often lack the ability to adjust to different beam sizes, which limits their versatility. Furthermore, they often rely on manual measurements for hole placement, which can lead to inaccuracies and inconsistencies. Another issue with existing automatic hole punching machines is the lack of a precise measuring device. This can result in holes being punched at incorrect locations or at inconsistent intervals, which can compromise the integrity of the final structure.

Additionally, these machines often lack a mechanism for adjusting the height and length of the punching apparatus, which can limit their applicability to beams of different sizes and shapes. Furthermore, existing automatic hole punching machines often have a fixed punching motor, which can limit their adaptability to different punching requirements. The lack of a rotatable guide can also make it difficult to punch holes at different angles or orientations.

In light of these limitations, there is a need for an automatic beam hole punch that can adjust to different beam sizes, provide precise measurements for hole placement, and offer flexibility in the punching process. Such a device would significantly improve the efficiency and accuracy of hole punching in beams, thereby enhancing the quality and reliability of the resulting structures.

SUMMARY OF THE INVENTION

The present invention pertains to an automatic beam hole punch for punching at least one hole in a beam. The beam hole punch can include a punching motor, a punch coupled to the punching motor, and a movable punching clamp coupled to the punching motor housing. The punching clamp can be secured to the punching motor to the top of the beam and can include a first portion, a second portion, a body, a first guide, a second guide, a travel distance sensor, and a support. The first and second portions are configured to contact the first face of the top of the beam when the beam hole punch is connected to the beam. The body can be fixed between the first and second portions and has a space in which the top of the beam may reside when the beam hole punch is connected to the beam. The first guide can be rotatably coupled to the first portion by at least one leg, and the second guide is coupled to the first portion. The travel distance sensor can be coupled to either the first or second guide, and the support can be coupled to the second portion and can be configured to contact the second face of the top when the clamp is supported to the beam. The support has a gap through which the punch passes when the motor actuates the punch.

The automatic beam hole punch can also include a method for punching at least one hole in a beam using the automatic beam hole punch. The method can involve providing a movable punching clamp, attaching the punching clamp to the top of the beam at a first location, aligning the punch with the desired punching location on the beam using a first guide or a second guide coupled to the clamp, actuating a punching motor to drive the punch through the top of the beam at the first location, and moving the punch clamp to a second location and actuating the punching motor to drive the punch through the top of the beam at the second location.

The automatic beam hole punch and the method of using it offer several advantages. The at least one leg of the clamp is adjustable, allowing the guide to adjust to the thickness of the top of the beam. The travel distance sensor can be configured to evaluate the distance between punches, and a display indicates to a user when the clamp has traveled a predetermined distance as measured by the travel distance sensor. The punching motor, the measuring device, and at least one motor can be coupled to a controller, which coordinates the operation of the punching motor, the guides, and the travel distance sensor. The measuring device can be a rotary encoder or a digital distance measuring sensor. The at least one leg of the clamp has at least one telescopic section with a lock that allows the legs to adjust in length. These features contribute to the accuracy and efficiency of the hole punching process.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims. Aspects and applications of the invention presented here are described below in the drawings and detailed description of the invention.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF DRAWINGS

These and other features, aspects, and advantages of the present specification will become better understood with regard to the following description, appended claims, and accompanying drawings where:

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

Figure 1:
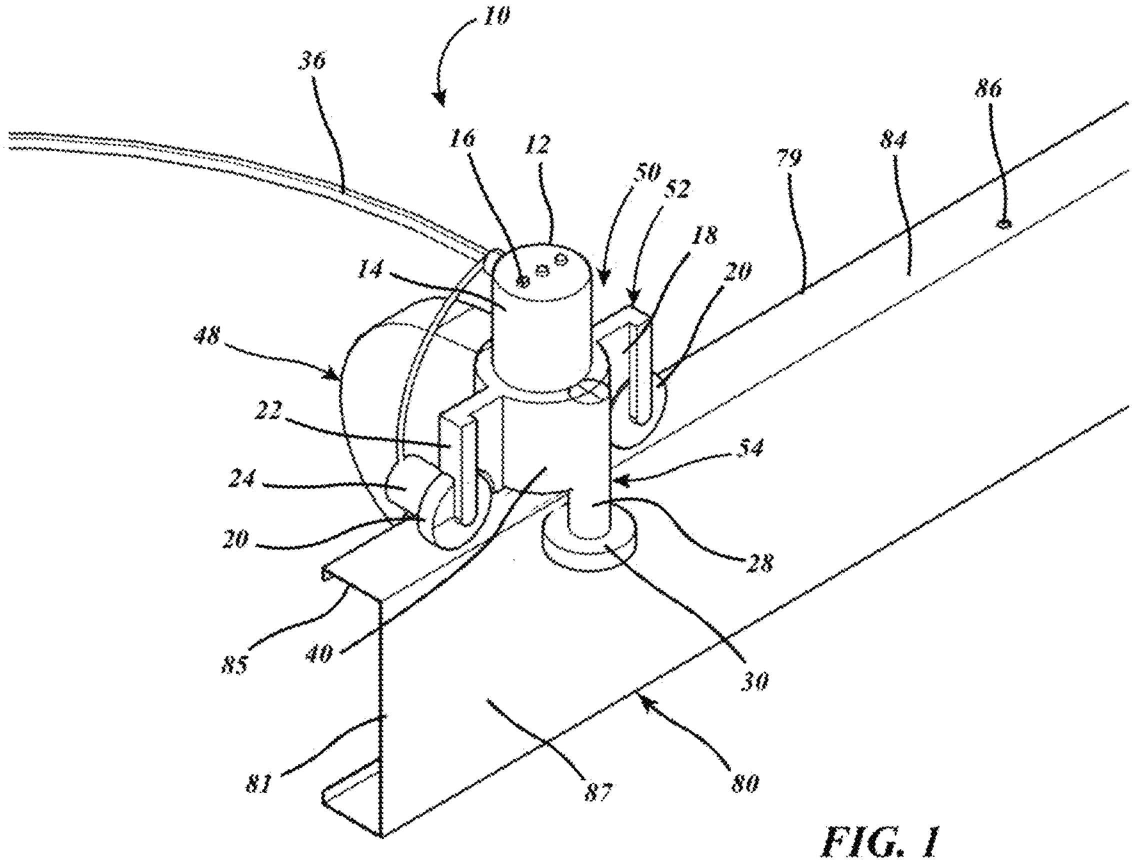
FIG. 1 is an isometric front view of the beam hole puncher in accordance to one, or more embodiments.
Figure 2:
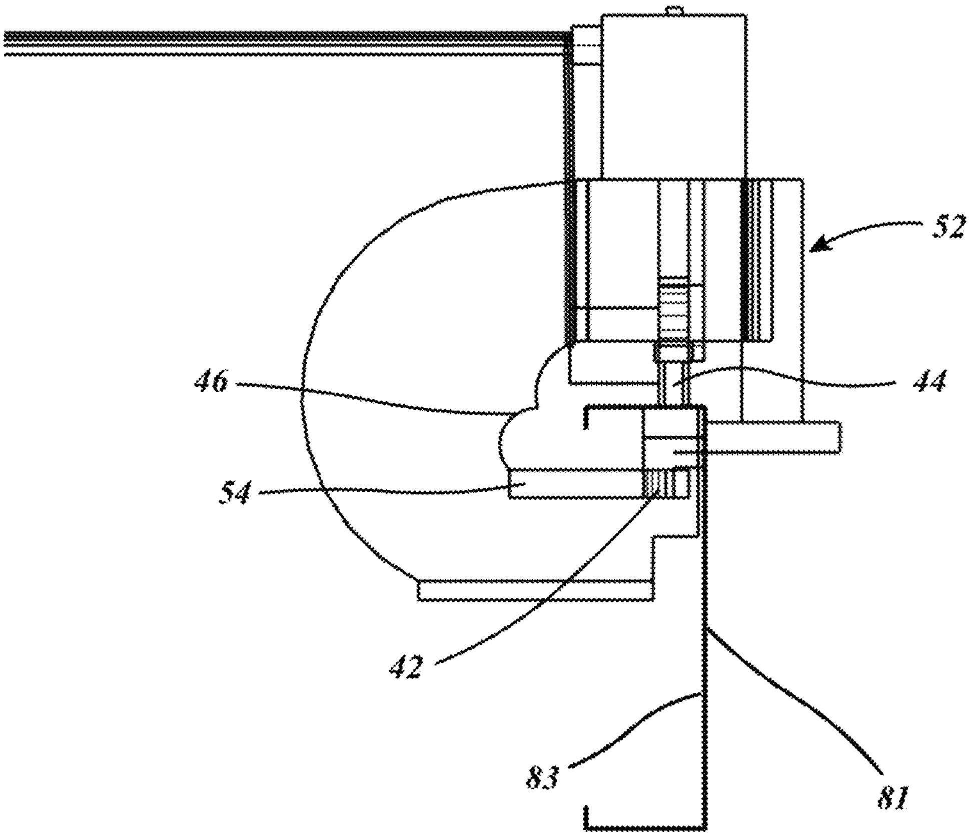
FIG. 2 is a side view of the beam hole puncher in accordance to one, or more embodiments.
Figure 3:
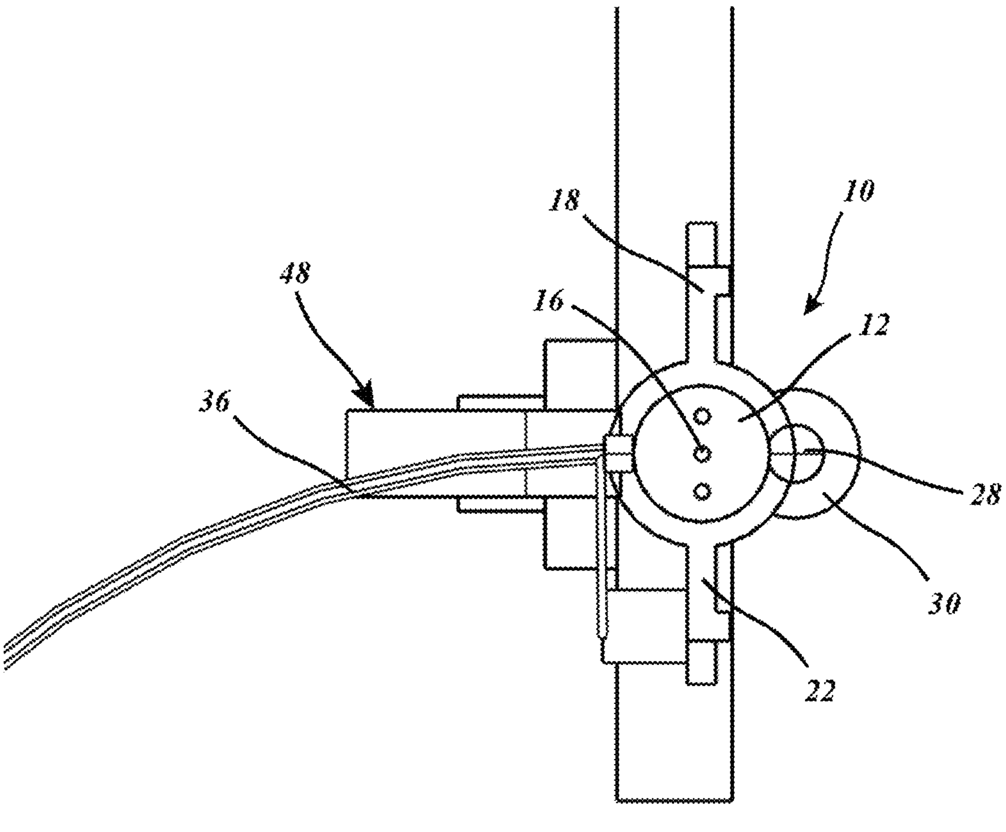
FIG. 3 is a top view of the beam hole puncher in accordance to one, or more embodiments.
Figure 4:
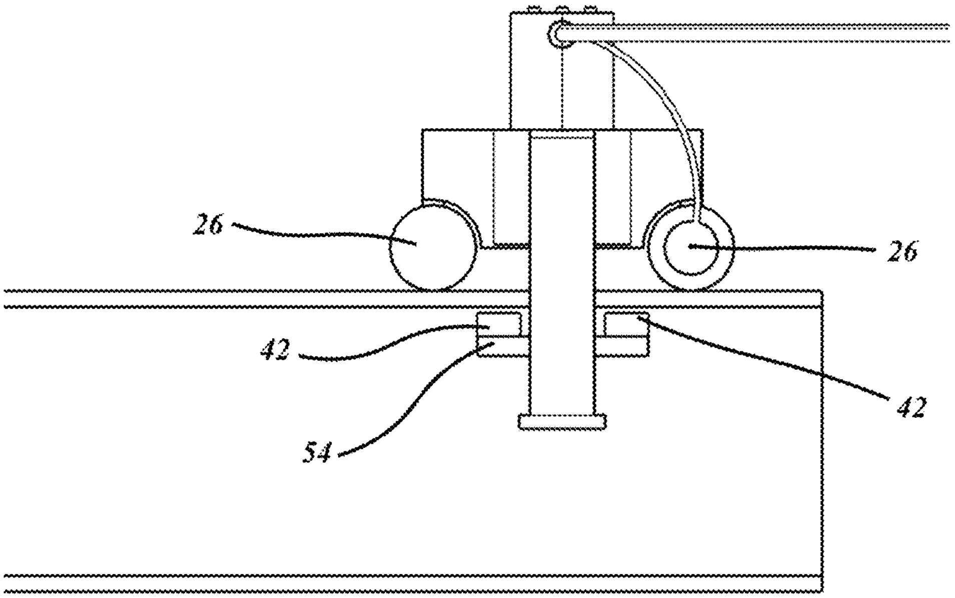
FIG. 4 is a back view of the beam hole puncher in accordance to one, or more embodiments.
Figure 5:
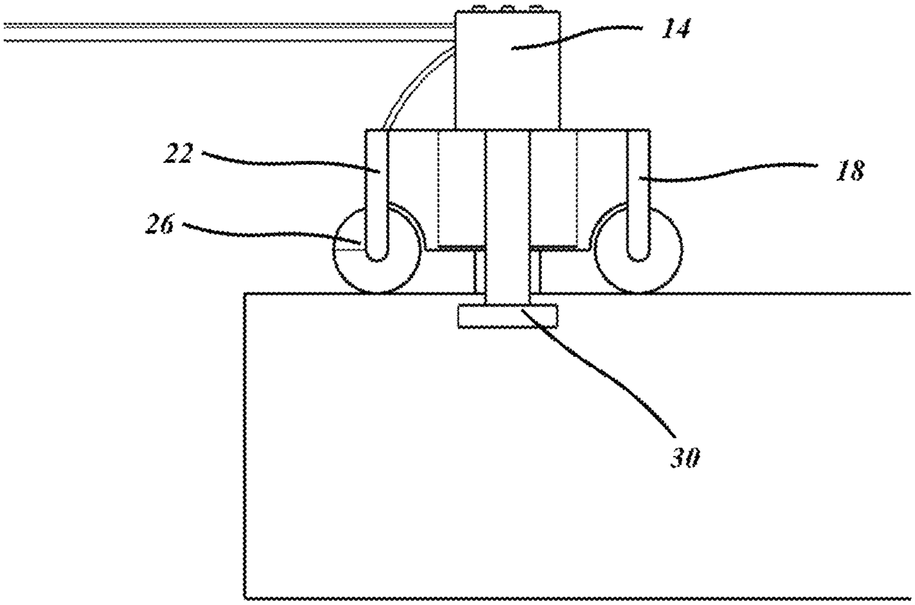
FIG. 5 is a front view of the beam hole puncher in accordance to one, or more embodiments.
Figure 6:
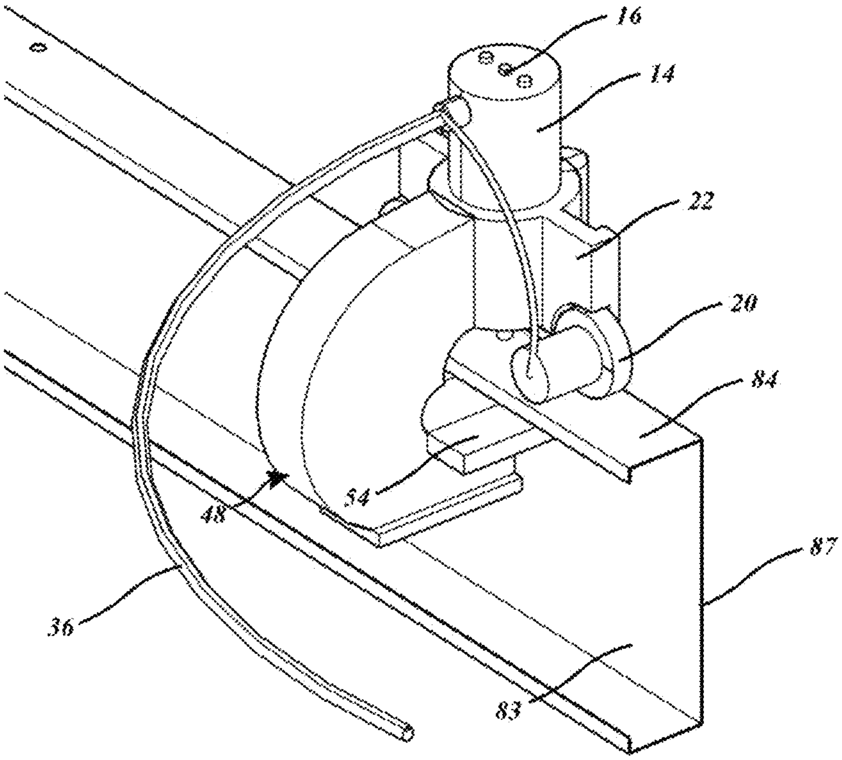
FIG. 6 is an isometric back view of the beam hole puncher in accordance to one, or more embodiments.

Referring initially to FIGS. 1-6, an automatic beam hole punch for punching at least one hole in a beam 80 having a top 79 that is intended to be punched and side 81 abutting the top is shown generally at 10. The automatic beam hole punch 10 can have a body 40 coupled to a punching motor housing 12 having a punch 44 coupled to a punching motor 14 wherein the punching motor actuates the punch. The punching motor 14 can be fully or partially encased by the punching motor housing 12 wherein the punching motor housing can be coupled to the body 40. The punching motor housing 12 can be an outer shell that encloses the punching motor 14 and provides a barrier between the motor and outside elements. The punching motor 14 can have a cooling fan to help dissipate the heat by drawing air over the motor's windings and other heat producing components. The punching motor housing 12 can have bearings that support the motor's rotor or shaft and allow it to move up and down smoothly. The punch 44 can create a plurality of holes 86 in the beams on the top 79 through the top first face 84 through to the top second face 85. The punch 44 can be removably attached or permanently coupled to the punching motor housing 12 and/or punching motor 14 and/or, a motor shaft wherein the user can attach or replace different types of such as, for example, hollow punch, solid punch, blade, different shape punches, or the like. In other embodiments, the punching motor 14 can be replaced and the punch 44 can be moved by such as, for example, pneumatically, electrically, hydraulically, or the like.

In embodiments, the punching motor housing 12 can be integral to the body 40 or can be removably attached to the house wherein the motor housing can be such as, for example, welded, bolted, riveted, integral to each other as one piece, or the like. In certain embodiments, the user can change out the punching motor 14 for different powered motors to suit the user's needs wherein the motor can be such as, for example, 200 watts, 500 watts, 1,000 watts, 5,000 watts, 10 kW or the like or the user can set different pressures within the pneumatics to increase the punch 44 pressure. The punching motor 14 can be powered by an alternating current ("AC") or direct current ("DC") wherein if it is connected to AC the motor can have a power cable 36 that can connect to an outlet, or if DC the motor can have a port for a battery to be connected to. The user can adjust the punching motor's 14 speed and punching power to be able to punch different thickness of material. The punching motor housing 12 can have at least one status light and/or LCD/LED screen that the user can see the status of the machine and set such as, for example, speed of punch, material thickness, punching power, speed of movement, or the like. The at least one light 16 can be such as, for example, light emitting diodes ("LED"), liquid crystal light, neon indicator light, laser diodes, or the like that can change colors depending on the status of the automatic beam hole punch 10 such as, for example, green, orange, red, yellow, or the like.

The automatic beam hole punch 10 can have a movable punching clamp 50 coupled to the punching motor housing 12 and can be configured to be secured to the top 79. The movable punching clamp 50 can have a first portion 52 secured about the punching motor 14 and configured to contact a top first face 84 of the top 79 when the beam hole punch is connected to the beam 80. A second portion 54 can be configured to contact a side first face 87 when the beam hole punch 10 is connected to the beam 80. The body 40 can be fixed between the first portion 52 and the second portion 54 that has a space in which the top 79 may reside when the beam hole punch is connected to the beam. At least one first guide 20 and a second guide 30 can be rotatably coupled or fixed to the first portion 52 by at least one leg configured to contact the top first face 84 when the beam hole punch is connected to the beam 80. The second guide 30 can be couple to the second portion 54 configured to contact the side first face 87 when the beam hole punch is connected to the beam 80. A travel distance sensor can be coupled to the first guide 20 and/or the second guide 30. In the preferred embodiment, the first guide 20 can be at least two guides, one on both sides of the body 40.

In embodiments, the at least one leg can be a first leg 18, a second leg 22 and a third leg 28. The first leg 18, the second leg 22, and the third leg 28 can be spaced equal distance around the body 40 axis or can unevenly spaced around the body axis. The first leg 18, second leg 22 and third leg 28 can extend from the body 40 and can be coupled to the at least one first guide 20 and second guide 30 which can be rotatably attached to the legs wherein the first guide 20 can be rotatably coupled to the first leg and second leg, a second guide 30 can be rotatably coupled to the to the third leg 28. The first leg 18, second leg 22 and third leg 28 can be fixed to the body 40 or can be rotatably coupled to the body. In certain embodiments, the at least one leg can be vertically adjustable with a clamping release that can allow the guide to adjust to the thickness of the top 79 and can secure the first guides to the beam 80. In other embodiments, the at least one leg can be fixed.

In embodiments, the at least one first guide 20 can be oriented vertically on the first leg 18 and the second leg 22. The at least one first guide 20 can rest on top of the beam 80 acting as supports and guides for the automatic beam hole punch 10. The first guide 20 and/or the second guide 30 can be coupled to at least one guide motor wherein the at least one guide motor can rotate the first guide and/or the second guide and move the beam hole punch 10 at a user specified distance on the beam 80. In certain embodiments, the first guide 20 and the second guide 30 can adjust vertically on the first leg 18 and the second leg 22. The first leg 18 and the second leg 22 can adjust the height that the punch can be from the top of the beam 80. The first leg 18, second leg 22, and third leg 28 can be such as, for example, casted, molded, drawn, stamped, or the like and can be made from one piece or multiple pieces and can be integral or coupled to the body 40.

In embodiments, the second guide 30 can be coupled to the second portion 54 configured to contact the side first face 87 when the beam hold punch is connected to the beam 80. The second guide 30 can be positioned horizontally on the third leg 28 and can come into contact with and move along the side first face 87 of the beam 80. The third guide 30 can be fixed to the body or in certain embodiments the third guide can adjust horizontally on the third leg 28. The third guide 30 can adjust to the thickness of the beam 80. The first guide 20 and second guide 30 can be made from such as, for example, steel, rubber, plastic, aluminum, or the like. The first guide 20 and second guide 30 can be such as, for example, roller bearing guides, linear guides, track rollers, cam roller guides, v-groove guides or the like.

In certain embodiments, the first leg 18, the second leg 22 and the third leg 28 can have a telescopic portion wherein the telescopic portion can be square or tubular legs sections wherein each leg section can be equipped with interlocking mechanism to hold the sections in place wherein the locking mechanism can be clamps, screws, pins, or the like. The user can change the height or length of telescopic legs using an adjustment control that can be such as, for example, a knob, lever, handle, or some other mechanism that allows them to release and secure the locking mechanism. The telescopic section can extend or retract from the fixed section or the body 40 allowing the user to adjust the legs to the different beam sizes. The telescopic section can be locked into the fixed section allowing the user to adjust the first leg 18, second leg 22, and third leg 28 and then lock it into place with the locking mechanism securely around the beam.

In other embodiments, the at least one first guide 20 and the second guide 30, can be removable from the first leg 18, second leg 22 and third leg 28 allowing the user to put different size guides to adjust to the size and thickness of the beam 80. The at least one first guide 20 and the second guide 30 can range in size by such as, for example, 0.125 inch, 0.25 inch, 0.5 inch, 1 inch, 1.5 inches, 2 inches, or the like. The at least one first guide 20 and the second guide 30 can be removably coupled to the first leg 18, second leg 22 and third leg 28 by such as, for example, a fastener, a pin, a rivet, bolt, bearing, press fit, loose fit or the like.

In embodiments, the automatic beam hole punch 10 can further comprise a measuring device 24 coupled to the at least one guide wherein the measuring device can be coupled to at least one of the at least one first guide 20 and the second guide 30 and can evaluate the travel distance between the punches. The measuring device 24 can be coupled to the at least one of the guide's shaft wherein as the guide moves along the beam the measuring device can measure the rotation of the device and convert the rotation into a distance. The measuring device 30 can be such as, for example, rotary encoder, a digital measuring sensor, phase-based range finder, laser interferometer, or the like. In certain embodiments, the measuring device 24 can be coupled to one or more guides for accuracy or multiple distance reading.

In embodiments, the automatic beam hole punch 10 can further comprise controller (not shown) which can reside in and be coupled to the punching motor housing 12 or the body 40. The controller can be such as, for example, micro-controller ("MCU"), programmable logic controller ("PLC"), proportional integral derivative ("PID") controller, motor controller, motion controller, or the like and can be connected to the control display and/or lights wherein the display can display indicate to a user when the clamp is determined to have traveled a predetermined distance by the travel distance sensor 24. The controller can control the lights, distance readings, motor punch, or the like and can allow the user to program such as, for example, length of beam and distance between holes, punch power, speed of punch, or the like. The punching motor, the measuring device and at least one motor can be coupled to the controller. The motor that moves the at least one guide can be such as, for example, DC motor, AC motor, brushed DC motor, stepper motor, servo motor, or the like. The user can control the motor by the controller which can move the automatic beam hole punch 10 down the beam 80 automatically.

In certain embodiments, the controller can comprise a wireless module which can allow the user to control the automatic beam hole punch 10 wireless and can send and receive data such as, for example, number of holes punched, distance between holes, x-y distance on the beam between holes, total distance traveled, or the like. The controller can additionally display information on the LED screen on the punching housing for the user to easily select the settings and visible see the information.

In embodiments, a support 48 can be coupled to the body 40 configured to contact the side second face 83 of the side 81 when the movable punching clamp 50 is supported by the beam 80, the support can have a gap through which the punch passes when the punching motor 14 actuates the punch. The automatic beam hole punch 10 can further comprise a slot 46 in the support 48 wherein the support can be coupled to a lower support 54 at the base of the slot. The lower support 54 can be rotatably coupled to at least one slot guide 42 which is configured to contact the side second face 83 when the beam hole punch is connected to the beam 80. In the preferred embodiment, the support 48 can be coupled to two guide supports 54 one on each side of the punch 44 wherein each guide support can each have the slot guide 42 wherein the guide support can be one integral to the support 48 or can be separate pieces fastened onto the support by such as, for example, bolt, screw, adhesive, revit, weld, pinned or the like.

In certain embodiments, the guide supports 54 and/or slot guides 42 can adjust horizontally to the thickness of the beam. The guide supports 54 and slot guides 42 can be made from such as, for example, steel, rubber, plastic, aluminum, or the like. The at least one first guide 20, second guide 30 and slot guide 42 can be such as, for example, roller bearing guides, linear guides, track rollers, cam roller guides, v-groove guides or the like. The slot guide 42 can range in size by such as, for example, 0.125-inch, 0.25 inch, 0.5 inch, 1 inch, 1.5 inches, 2 inches, or the like. The slot guide 42 can be removably coupled to the first leg 18, second leg 22 and third leg 28 by such as, for example, a fastener, a pin, a rivet or the like.

In certain embodiments, the at least one guide support 54 can have a telescopic portion wherein the telescopic portion can be square or tubular legs sections wherein each leg section can be equipped with interlocking mechanism to hold the sections in place wherein the locking mechanism can be clamps, screws, pins, or the like. The at least one guide support 54 can adjust the horizontal distance that the slot guide 42 can be from the side second face 83 of the beam 80. The at least one guide support 54 and slot guide 42 can be such as, for example, casted, molded, drawn, stamped, or the like and can be made from one piece or multiple pieces.

A method for punching at least one hole in a beam using an automatic beam hole punch, the beam having a top that is intended to be punched and a side 81 abutting the top 79 wherein the method can comprise providing a movable punching clamp comprising a first portion 52 configured to contact a top first face of the top when the beam hole punch is connected to the beam. A second portion 54 configured to contact a side first face of the side when the beam hole punch is connected to the beam. A body can be fixed between the first portion 52 and the second portion 54 that has a space in which the top may reside when the beam hole punch is connected to the beam.

A first guide 20 can be rotatably coupled to the first portion 52 by at least one leg configured to contact the first face when the beam hole punch is connected to the beam. A second guide 30 couple to the first portion 52 configured to contact the side first surface 87 when the beam hole punch is connected to the beam and a slot guide configured to contact the side second surface 83. A travel distance sensor coupled to the first guide 20 or the second guide 30. A support can be coupled to the second portion 54 configured to contact the side first face of the top when the clamp is supported to the beam, the support having a gap through which the punch passes when the motor actuates the punch. Attaching the punching clamp to the top at a first location and adjusting the length of the at least one leg to secure the clamp to the beam. Aligning the punch with the desired punching location on the beam using a first guide and/or a second guide coupled to the clamp. Actuating a punching motor to drive the punch through the top of the beam at the first location. Moving the punch clamp to a second location and actuating the punching motor to drive the punch through the top of the beam at the second location.

Attaching the automatic beam hole punch further comprises rotating the first guide or the second guide using at least one motor to align the punch with the beam. Determining the distance between the first location and the second location using the travel distance sensor and positioning the punch at the next punching location based on the measured distance. Displaying an indication to a user when the clamp has traveled a predetermined distance as measured by the travel distance sensor. Coupling the punching motor, travel distance sensor, and at least one motor controlling the guides to a controller and using the controller to coordinate the operation of the punching motor, the guides, and the travel distance sensor. Actuating the punching motor further comprises using a rotary encoder or a digital distance measuring sensor as the travel distance sensor to evaluate the punch's alignment and spacing. Extending or retracting a telescopic section of at least one leg of the clamp to secure the automatic beam hole punch to the beam and locking the leg at the appropriate length.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. An automatic beam hole punch for punching at least one hole in a beam having a top that is intended to be punched and a side abutting the top, the beam hole punch comprising:
- a punching motor at least partially encased in a punching motor housing;
- a punch coupled to the punching motor wherein the punching motor actuates the punch;
- a movable punching clamp coupled to the punching motor housing and configured to secure the punching motor to the top, the punching clamp comprising:
  - a first portion secured about the punching motor and configured to contact a top first face of the top when the beam hole punch is connected to the beam;
  - a second portion configured to contact a side first face of the side when the beam hole punch is connected to the beam;
  - a body fixed between the first portion and the second portion that has a space in which the top may reside when the beam hole punch is connected to the beam;
  - at least one first guide rotatably coupled to the first portion by at least one leg configured to contact the first face when the beam hole punch is connected to the beam;
  - a second guide couple to the first portion configured to contact the side first face when the beam hole punch is connected to the beam;
  - a travel distance sensor coupled to the first guide or the second guide; and
  - a support coupled to the body configured to contact side second face of the side when the clamp is supported to the beam, the support having a gap through which the punch passes when the motor actuates the punch.

2. The automatic beam hole punch according to claim 1, wherein the at least one leg is adjustable allowing the guide to adjust to the thickness of the top.

3. The automatic beam hole punch according to claim 2, wherein the at least one leg adjusts to secure the beam hole punch to the beam.

4. The automatic beam hole punch according to claim 1, wherein the first guide or the second guide is coupled to at least one motor wherein the at least one motor rotates the first guide and/or the second guide.

5. The automatic beam hole punch according to claim 1, wherein the punching motor, a measuring device and at least one motor are coupled to a controller.

6. The automatic beam hole punch according to claim 5, wherein the measuring device is a rotary encoder or a digital distance measuring sensor.

7. The automatic beam hole punch according to claim 1, wherein the at least one leg has at least one telescopic section with a lock that allows the legs to adjust in length.

8. The automatic beam hole punch according to claim 1, wherein the travel distance sensor is configured to evaluate the distance between punches.

9. The automatic beam hole punch according to claim 1, further comprising a display indicating to a user when the clamp is determined to have traveled a predetermined distance by the travel distance sensor.

10. The automatic beam hole punch according to claim 1, further comprising at least one slot guide rotatably coupled to a slot guide support which is coupled to the support wherein the slot guide is configured to contact the side second face when the beam hole punch is connected to the beam.

11. A method for punching at least one hole in a beam using an automatic beam hole punch, the beam having a top that is intended to be punched and a side abutting the top, the method comprising:
- providing a movable punching clamp comprising:
  - a first portion configured to contact a first face of the top when the beam hole punch is connected to the beam;
  - a second portion configured to contact a second face of the top when the beam hole punch is connected to the beam;
  - a body fixed between the first portion and the second portion that has a space in which the top may reside when the beam hole punch is connected to the beam;
  - a first guide rotatably coupled to the first portion by at least one leg configured to contact the first face when the beam hole punch is connected to the beam;
  - a second guide couple to the first portion configured to contact the side when the beam hole punch is connected to the beam
  - a travel distance sensor coupled to the first guide or the second guide; and
    - a support coupled to the second portion configured to contact the second face of the top when the clamp is supported to the beam, the support having a gap through which the punch passes when the motor actuates the punch;
- attaching the punching clamp to the top at a first location and adjusting the length of the at least one leg to secure the clamp to the beam;
- aligning the punch with the desired punching location on the beam using a first guide or a second guide coupled to the clamp;
- actuating a punching motor to drive the punch through the top of the beam at the first location; and
- moving the punch clamp to a second location and actuating the punching motor to drive the punch through the top of the beam at the second location.

12. The method of claim 11, wherein the step of attaching the automatic beam hole punch further comprises rotating the first guide or the second guide using at least one motor to align the punch with the beam.

13. The method of claim 11, further comprising the steps of determining the distance between the first location and the second location using the travel distance sensor and positioning the punch at the next punching location based on the measured distance.

14. The method of claim 13, further comprising displaying an indication to a user when the clamp has traveled a predetermined distance as measured by the travel distance sensor.

15. The method of claim 11, further comprising the steps of coupling the punching motor, travel distance sensor, and at least one motor controlling the guides to a controller and using the controller to coordinate the operation of the punching motor, the guides, and the travel distance sensor.

16. The method of claim 11, wherein the step of actuating the punching motor further comprises using a rotary encoder or a digital distance measuring sensor as the travel distance sensor to evaluate the punch's alignment and spacing.

17. The method of claim 11, further comprising extending or retracting a telescopic section of at least one leg of the clamp to secure the automatic beam hole punch to the beam, and locking the leg at the appropriate length.

* * * * *